(No Model.) 2 Sheets—Sheet 1.
P. G. EMERY.
BELL CORD SUPPORT.
No. 534,869. Patented Feb. 26, 1895.
*Fig. 1.*
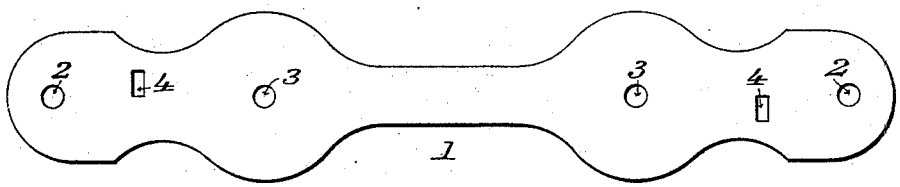
*Fig. 2.*  *Fig. 3.*  *Fig. 4.*
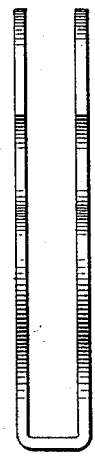 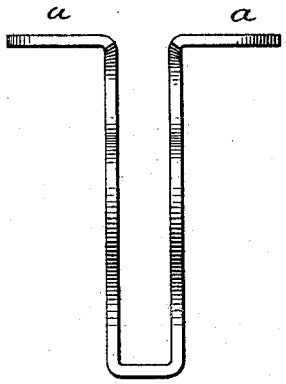 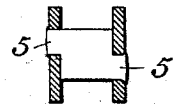
*Fig. 5.*
*Fig. 6.* *Fig. 7.*
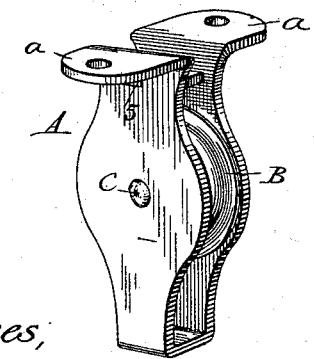 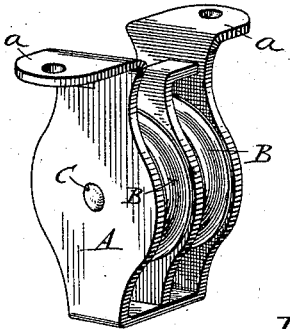
Witnesses,
Inventor:
PLATO G. EMERY
by his attorneys (No Model.) 2 Sheets—Sheet 2.

P. G. EMERY.
BELL CORD SUPPORT.

No. 534,869. Patented Feb. 26, 1895.

Witnesses;
Sidney P. Hollingworth
Chas. A. Place.

Inventor,
PLATO G. EMERY
by his attorneys,

UNITED STATES PATENT OFFICE.

PLATO G. EMERY, OF CHICAGO, ILLINOIS, ASSIGNOR TO THE ADAMS & WESTLAKE COMPANY, OF ILLINOIS.

BELL-CORD SUPPORT.

SPECIFICATION forming part of Letters Patent No. 534,869, dated February 26, 1895.

Application filed September 27, 1894. Serial No. 524,248. (No model.)

*To all whom it may concern:*

Be it known that I, PLATO G. EMERY, of Chicago, in the county of Cook and State of Illinois, have invented certain new and useful Improvements in Bell-Cord Supports for Use on Street and other Cars, of which the following is a full, clear, and exact description.

Heretofore, so far as I am informed, it has been customary to make devices of this character of cast metal; and my invention has for its object, in part, the construction of such devices of sheet metal, thereby obtaining a cheaper article, as also one possessing other advantages not pertaining to those heretofore in use.

My invention is applicable to either single or double pulley devices.

Figure 8:
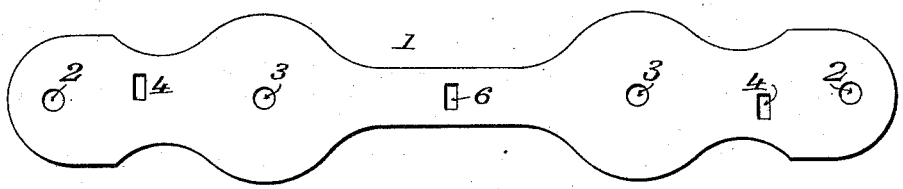
Figure 9:
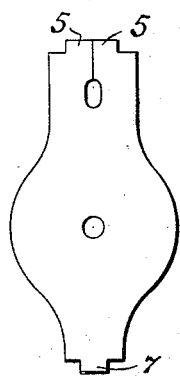
Figure 10:
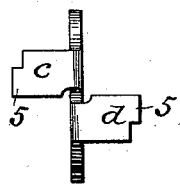
Figure 11:
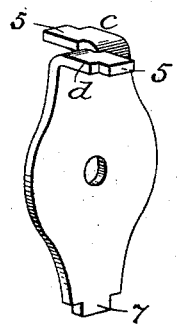
Figure 12:
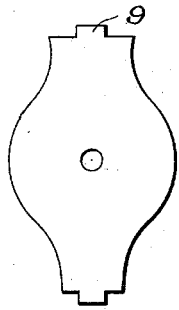
Figure 13:
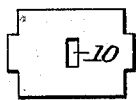
Figure 14:
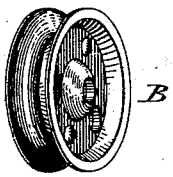
Figure 15:
Figure 16:

In the accompanying drawings, Figure 1 represents the blank of which the frame for a single pulley is formed, with the necessary perforations for purposes hereinafter described. Fig. 2 shows the same blank bent upward to the right and left of the center of its length to form the sides or walls of the frame. Fig. 3 shows the same blank further bent to form upper flanges for attaching the frame to the car ceiling or other fixture. Fig. 4 shows a detail entering into the construction of the frame for the single pulley, as hereinafter described. Fig. 5 shows a detail consisting of a brace used between the walls of the frame. Fig. 6 is a perspective view of the frame and single pulley complete, forming together a single pulley bell rope support. Fig. 7 is a similar view showing the use of a support having two pulleys. Fig. 8 shows the blank used in the formation of the frame for two pulleys. Fig. 9 shows a blank of a central division wall used in the construction of the frame for two pulleys. Fig. 10 shows a top edge view of the same blank bent in opposite directions for connection to the frame. Fig. 11 is a perspective view of the said central division wall. Figs. 12 and 13 show the said division wall formed of two parts as hereinafter described. Fig. 14 is a perspective view of a pulley formed of two pieces of sheet metal bent or stamped to shape and riveted together. Fig. 15 is a vertical section of one-half of the pulley. Fig. 16 is a view of a bushing held between the two sections of the pulley and through which the central rivet or bearing passes.

Similar letters and figures of reference indicate similar parts in the respective views.

1 is the sheet metal blank of which the frame for a single pulley is formed, and which blank is provided with end circular holes 2, 2, intermediate circular holes 3, 3, and end rectangular or square perforations 4, 4. The blank may be stamped out and completed so as to include the several perforations, or they may be subsequently added to an imperforate blank. As shown in Fig. 2, the preliminary formation of the frame, which as a whole is designated by A, is produced by turning up the blank to the right and left of its length, so as to form sides or walls. The next step in the formation of the frame consists in turning outward the parts which include the end circular holes 2, 2, thus constituting flanges *a a*, for the attachment of the frame A to the car ceiling or other fixture. It will be seen that the circular holes 3, 3, are now brought in line so as to register with each other to receive the rivet or shaft C, on which the pulley B is mounted. The pulley B having been placed between the walls of the frame, and the ends of the rivet or shaft C inserted ready to be riveted over so as to cause it to be fixed in the frame, the two walls are braced, and the whole device completed by inserting the tongues 5 of the brace, Fig. 5, into the rectangular openings 4, and riveting the said rivet or shaft C and the tongues over upon the exterior of the walls. The pulley B has free rotary movement upon the stationary rivet or shaft C.

In a frame adapted for two pulleys, the same character of blank used in the formation of the frame for a single pulley, is used, except that, as seen in Fig. 8, it is provided with a central rectangular or square opening 6, for a purpose hereinafter described. The various steps in the bending of the blank are practiced as above described, except that greater width is allowed between the walls for the accommodation of the two pulleys B and the central division wall, as will be hereinafter pointed out. The blank 1 having been bent so as to produce the vertical walls, horizontal bottom and the flanges a a parallel to the bottom, the central division wall, Fig. 11, is to be inserted. The slitted upper portion of the wall having been bent over so as to form the two horizontal parts c and d furnished with the tongues 5, it is fitted to the walls of the frame, the lower tongue 7, entering the rectangular or square opening 6 of the blank 1, while the tongues 5 of the horizontal parts c and d enter the rectangular openings 4, the latter being placed in the blank so that one is on each side of the vertical longitudinal center of the device, thus giving additional bracing effect. The several tongues are riveted over upon the exterior of the walls, as also is the rivet or shaft C for the pulleys B, which have been inserted, the latter being allowed free rotation upon their axes.

Figs. 12 and 13 show a modification of the central division wall for the frame A designed to receive two pulleys, it being seen that instead of having a slitted upper portion as shown in Fig. 9, it is provided with a tongue 9, adapted to enter a perforation 10 of the horizontal blank Fig. 13, which takes the place of the bent over horizontal parts c and d of Figs. 10 and 11.

This invention, in either of its forms, provides a cheap, strong and simple construction, applicable not only to the uses to which it is here described as more particularly pertaining but as a sash cord pulley and for other substantially analogous purposes.

Having described my invention, I claim—

Combined in a bell cord support, a U-shaped frame consisting of a perforated sheet of metal bent to form a horizontal bottom, vertical walls and horizontal flanges, said flanges having holes adapting the frame to be secured to a ceiling or other fixture, a grooved cord pulley mounted between said vertical walls, and a brace furnished with tongues projecting through perforations in the frame and riveted over upon the exterior surface thereof, substantially as set forth.

In testimony whereof I hereto set my hand and seal.

PLATO G. EMERY. [L. S.]

Witnesses:
A. HENDYCE,
G. DELMORE KELFER.